United States Patent
Ranger

(10) Patent No.: US 7,874,388 B2
(45) Date of Patent: Jan. 25, 2011

(54) ELECTRIC VEHICLE

(75) Inventor: Scott Ranger, Nathan (AU)

(73) Assignee: Letrix Power Hangzhou Pty Ltd., Hangzhou, Zhejiang Province (CN)

( * ) Notice: Subject to any disclaimer, the term of this patent is extended or adjusted under 35 U.S.C. 154(b) by 1188 days.

(21) Appl. No.: 10/552,365

(22) PCT Filed: Apr. 5, 2004

(86) PCT No.: PCT/CN2004/000310

§ 371 (c)(1),
(2), (4) Date: Feb. 17, 2006

(87) PCT Pub. No.: WO2004/087457

PCT Pub. Date: Oct. 14, 2004

(65) Prior Publication Data

US 2007/0107954 A1    May 17, 2007

(30) Foreign Application Priority Data

Apr. 3, 2003   (CN) .............................. 03 2 30103 U
Apr. 9, 2003   (CN) .............................. 03 2 30312 U

(51) Int. Cl.
*B60K 1/00* (2006.01)
(52) U.S. Cl. ...................................... 180/65.1; 180/907
(58) Field of Classification Search ................ 180/65.1, 180/65.2, 214, 253, 252, 907, 908
See application file for complete search history.

(56) References Cited

U.S. PATENT DOCUMENTS

| | | | | |
|---|---|---|---|---|
| 3,213,957 A | * | 10/1965 | Wrigley | 180/208 |
| 3,566,985 A | * | 3/1971 | Triplett | 180/214 |
| 4,573,549 A | * | 3/1986 | Pankow | 180/216 |
| 5,697,465 A | * | 12/1997 | Kruse | 180/65.1 |
| 5,772,237 A | * | 6/1998 | Finch et al. | 180/65.1 |
| 5,911,426 A | * | 6/1999 | Yamamoto et al. | 280/124.128 |
| 5,921,338 A | * | 7/1999 | Edmondson | 180/65.5 |
| 6,851,498 B1 | * | 2/2005 | Sauve | 180/208 |
| 7,077,229 B2 | * | 7/2006 | Lee | 180/220 |
| 7,264,272 B2 | * | 9/2007 | Mulhern et al. | 280/755 |
| 2002/0060100 A1 | | 5/2002 | Nagura et al. | |
| 2003/0141121 A1 | * | 7/2003 | Flowers et al. | 180/65.1 |

FOREIGN PATENT DOCUMENTS

DE    197 32 468 A1    7/1996

* cited by examiner

*Primary Examiner*—S. Joseph Morano
*Assistant Examiner*—Bridget Avery
(74) *Attorney, Agent, or Firm*—Butzel Long

(57) ABSTRACT

A mini-type electric vehicle, which is mainly used for individual transportation and includes a frame, a seat, front and rear wheels, a driving device, a battery, a steering system and a front wheel suspension device. A casing in which the battery is placed is provided forward in the middle position of the front end of the frame. The suspension device for front wheels has a front convex shape and a rear concave shape and covers the front end of the casing, and pivots to the middle of the front end of the casing. Two front wheels are installed on the front wheel suspension device. The rear edge line of the two front wheels is located at the rear of the battery front edge. The steering system is connected to the front end of the frame and interlocks with the front wheels. The battery is installed at the front so as to balance the weight distribution, improve the driving safety, comfort and steering performance for electric vehicle.

10 Claims, 4 Drawing Sheets

ELECTRIC VEHICLE

TECHNICAL FIELD

The present invention relates to electric vehicles and more particularly relates to mini-type four-wheel electric vehicles.

BACKGROUND OF THE INVENTION

Nowadays, mini electric vehicles are widely used and popular for features such as their being easy to drive and environmentally friendly. In many areas, since aged and disable people have difficulty driving, walking or using public transportation, electric vehicles usually become their first choice of transportation. In addition, the electric vehicles can also be used in pedestrian traffic, traffic in industrial and commercial settings as well as in sport activities such as transportation on golf courses, etc. The structure of current mini electric vehicles normally places the battery under the passenger seat. Since this type of vehicle is driven by the rear wheel, and its motor and driving device are also installed under the passenger seat. This configuration result in the vehicle having a heavy rear weight. In some occasions especially when climbing mountains or slopes this type of mini electric vehicle may turnover backward and cause injury to the passenger. In order to avoid this type of accident some electric vehicles have anti-turnover wheels installed at rear portions thereof. Such measures increase the cost and make the structure more complex.

Furthermore, since the weight distribution is seriously unbalanced and the handlebars are light, the steering balance is not easy to control. Therefore, the steering and driving performance of current electric vehicles is unsatisfactory. If a suspension device is used, since the front weight is light, the spring force is small and damping of the suspension is not realized.

Some have put the battery on the steering shaft to increase the front weight and balance the weight between the front and rear. However, since this increases the load on the steering shaft, steering becomes difficult and the center of gravity is raised so that safety is reduced. Hence, this approach is also not good.

SUMMARY OF THE INVENTION

The present invention provides an electric vehicle in which the battery is placed at the front so as to balance the weight distribution and improve the safety and driving performance of the vehicle.

The present invention further provides an electric vehicle that has good suspension damping performance and improved driving comfort.

The present invention further provides an electric vehicle that has good steering performance, including improved control, flexibility and smoothness.

Generally, electric vehicles are limited by storage and transportation space. When the battery is placed at the front of the electric vehicle according to the present invention it is necessary to increase the length and weight of the vehicle and to avoid occupying the space where the driver would normally place his or her feet. Hence, according to the present invention, the structure of the frame and front wheel suspension of the device is improved at the same time.

The concept of the present invention is to design the front end of the frame as a forward protruding casing in which the battery can be placed while designing the suspension of the device as front convex and rear concave shapes that are covered on the frame casing. In this way, the length of the electric vehicle is not increased by including any additional parts and the space at the front is also fully used since the battery is placed at the front.

The electric vehicle of the present invention comprises a frame, a seat, two front wheels, a two rear wheels, a driving device, a battery, a steering system and a front wheel suspension device. The middle and rear parts of the frame, seat, rear wheel and the driving device are the same as similar conventional components. Accordingly, a detailed description of these conventional components is omitted in the present description.

According to the present invention the middle position of the front end of the frame protrudes forward and includes a casing, on which the battery is placed.

The front wheel suspension device has a front convex and a rear concave shape covering the front end of the casing. A pivot joint is provided at the middle of the front end of the casing and two front wheels are installed on the front wheel suspension device. The rear edge line of the two front wheels is located at the rear of the battery front edge.

The steering system is connected to the front end of the frame and interlocks with the front wheels.

The middle of the front end of the casing is provided with two upper/lower projecting connection parts, on which two pairs of upper/lower pivot joints with reverse setting are provided.

The front wheel suspension device includes a pair of front upper cantilevers, a pair of front lower cantilevers and a vibration damper. The front ends of the front upper and lower cantilevers are connected to the pivot joint parts along the axis of electric vehicle length direction, respectively. The rear ends of the cantilevers extend towards the rear side of the frame casing, forming two similar upper/lower trapezoids. The two left and front cantilevers and the two right front cantilevers are connected separately with left and right ball head pins at the rear. On the left and right head pins are left and right axles which are used to fix the left and right front wheels. Two dampers are provided near the rear end of the cantilever, with one end thereof connected to the frame while the other end thereof is connected to the cantilever.

The steering system includes left and right lateral bars, a steering shaft and a steering handle. The steering shaft can be provided at the front end of the frame so as to move rotationally and interlock with the above axles via lateral bars.

In order to improve the firmness of the suspension device, two pairs of upper/lower rear cantilevers are additionally provided on the suspension device, which cantilevers are basically parallel to the front edge of the frame and form the bottom line of trapezoids, wherein one end thereof is connected to the pivot joint parts while the other end thereof is fixed near the rear end of the front cantilevers.

Stands for steering shaft installation are provided on the upper/lower connection parts, respectively. A ball bearing is installed on the stand for free turning of the steering shaft.

The steering shaft has a forward protruding part between the upper and lower stands which provides a turning connection of lateral bars.

The lateral bars are ball head link bars.

The front end of the upper/lower connection part is supported with an I-shaped steel bracket.

The casing has downward concave cavity for receiving a battery therein.

This invention provides the abovementioned structure of front frame and suspension device. The battery is moved to the front on the premise of not increasing electric vehicle length. Thus, the battery placement balances the front to rear distribution. Since the center of gravity of the electric vehicle is at the middle, the driving stability is improved, especially when climbing slopes so that the vehicle will not tilt backward even if no anti-tilting wheels are installed. In addition, the installation position of the battery is relatively low which makes the center of gravity of the vehicle lower so that safe driving can be realized.

Increasing the weight at the front of the electric vehicle allows the front wheel suspension device to bear more force. This provides full play to suspension damping and improves the driving comfort. Furthermore, because the weight of the front of the vehicle is increased, the friction of wheels is balanced which increases the friction of the front wheel during turning. In this way, the steering and control performance of the electric vehicle is improved.

Finally, this invention provides with sufficient room for placing more batteries and thereby increasing the power reserve for the electric vehicle so that the driving range can be increased.

BEST MODE FOR CARRYING OUT THE INVENTION

The following is a detailed description of a specific implementation example of the invention presented in reference to the attached figures.

Figure 1:
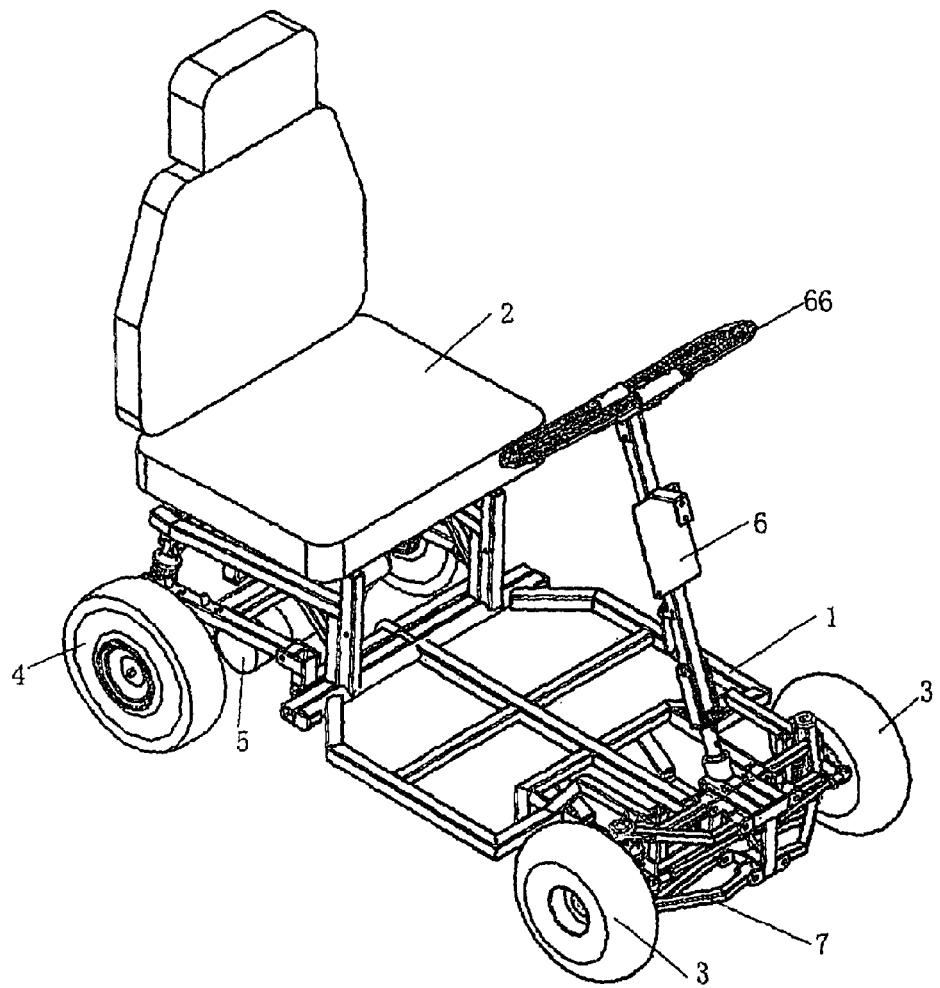
FIG. 1 is a structural schematic drawing of an electric vehicle according to one embodiment of the present invention.

FIG. 1 is a four-wheel mini electric vehicle for one person which comprises a frame 1, a seat 2, two front wheels 3, two rear wheels 4, a driving device 5, a battery, a steering system 6 and a front wheel suspension device 7. The middle and rear portions/parts of the vehicle can be of conventional design and therefore no detailed description of these portions/parts is included herein.

Figure 2:
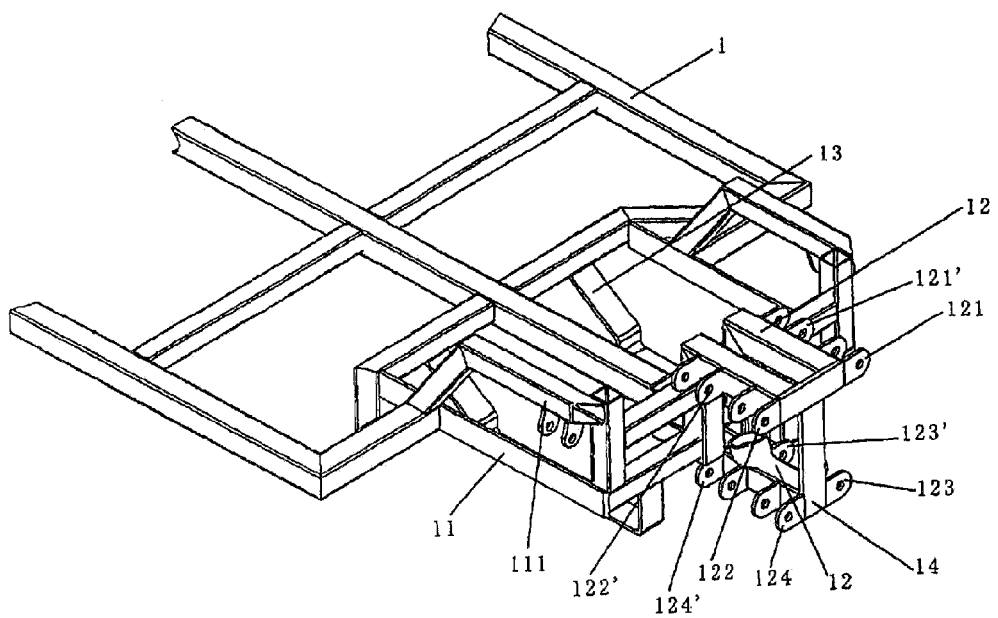
FIG. 2 is a structural schematic drawing of the frame front of an electric vehicle according to one embodiment of the present invention.

As shown in FIG. 2, the front of the frame 1 is basically a plane frame structure of which the middle position includes a protruding forward a casing 11. The two concave positions of the casing 11 are used for fixing front wheels. Thus, the front width of the vehicle is not increased. The size of the casing 11 is configured to be suitable for placing the battery, matched to the electric vehicle, in a protruding way out of the frame body. In addition, a small recess can be provided in the frame based on the size of the battery. The casing can be coplanar with the or the battery receiving portion can be made concave 13 to lower the center of gravity of the electric vehicle and make the height that the battery protrudes out of the frame less. When the driver is very tall, the two sides of the battery can be used for the driver to place his or her feet on.

In order to improve the strength of the front of the casing 11, two beams can be provided at the front. If the material strength is sufficient, one beam can be used. At the middle of the beam are two upper/lower connection parts 12 for connecting cantilevers and a steering shaft. The two connection parts 12 protrude forward from casing 11 and are fixed to each other with an I-shaped steel bracket 14 at the front end. At the upper/lower connection parts 12 are two pairs of front/rear pivot joints 121, 122, 123, 124, 121', 122', 123', 124' which provide for pivot-joining of the cantilevers. Also provided on the upper/lower connection parts 12, are steering shaft stands 64 and 65 that include a steering bearing installed for free and smooth rotation of steering shaft 63.

Figure 3:
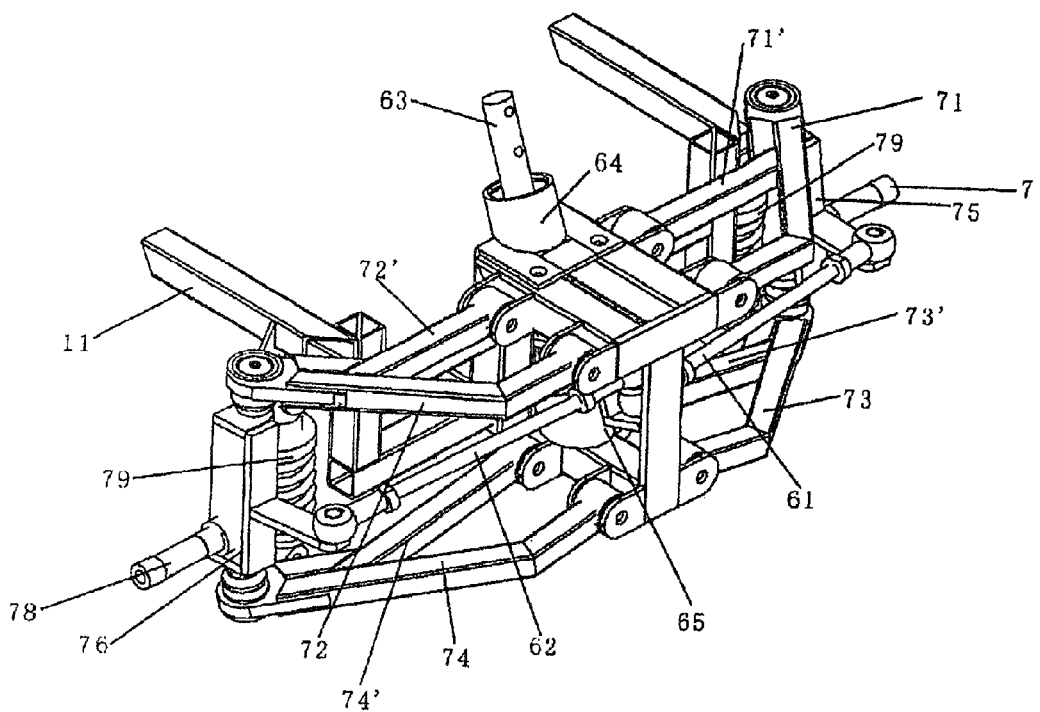
FIG. 3 is a structural schematic drawing of frame front, suspension device and part of the steering system of electric vehicle according to one embodiment of the present invention.

As can be seen from FIG. 3 the front wheel suspension device 7 includes a pair of front upper cantilevers 71, 72, a pair of front/lower cantilevers 73, 74, and a vibration damper 79 at both right and left sides. The front ends of the upper/lower cantilevers 71, 72, 73, and 74 are connected to the pivot joints 121', 122', 123', and 124' along the axis of the electric vehicle in the length direction. The rear end of the cantilevers extend towards their side rear to the side of the frame casing as shown. The left front cantilevers 71, 73 and right front cantilevers 72, 74 are connected at the rear end to left/right ball head pins 75, 76 respectively. On the left/right ball head pins 75, 76 are left/right axles 77, 78 for fixing the left/right front wheel 3. Vibration damper 79 is provided near the rear end of the cantilevers with one end thereof connected to a beam 111 of the frame 11 and the other end thereof connected to the lower cantilevers near the rear end of the lower cantilevers as shown.

In order to improve the firmness of the suspension device, a pair of the rear and upper cantilevers 71', 72' and a pair of the rear and lower cantilevers 73', 74' are provided which are substantially parallel to front edge of casing 11. One end of each of the rear cantilevers are connected to pivot joints 121', 122', 123', 124', respectively, while the other ends thereof are fixed near the rear end of the front cantilevers 71, 72, 73, and 74. Thus, the front and rear cantilevers form two upper/lower triangle or trapezoid shaped structures covering the front end of the casing 11. The bevel edge angle of the triangle or trapezoid shaped structures can be determined based on the size of the electric vehicle. The preferred angles range from 40°-50°. With this structure, on the premise of increasing the length of the electric vehicle, sufficient room for battery is provided. The front wheels 3 fixed on axles 77 and 78 lie in the concave position of the side of the casing 11. Hence, the width of the front part of the vehicle is not increased. In addition, the rear edge of the two front wheels 3 coincides with the rear of the front edge of the battery.

The battery is placed on the frame 11. When the electric vehicle is driven, bumping is transferred to the axle via the front wheels and then transferred to cantilevers via ball head pins. After damping by the vibration damper 79 connected to the cantilevers, as a result of the increase in the front weight of the electric vehicle, the force transferred to the frame does not cause great vibration to be transferred along the front frame. Thus, the damping effect of the suspension device is improved.

Figure 4:
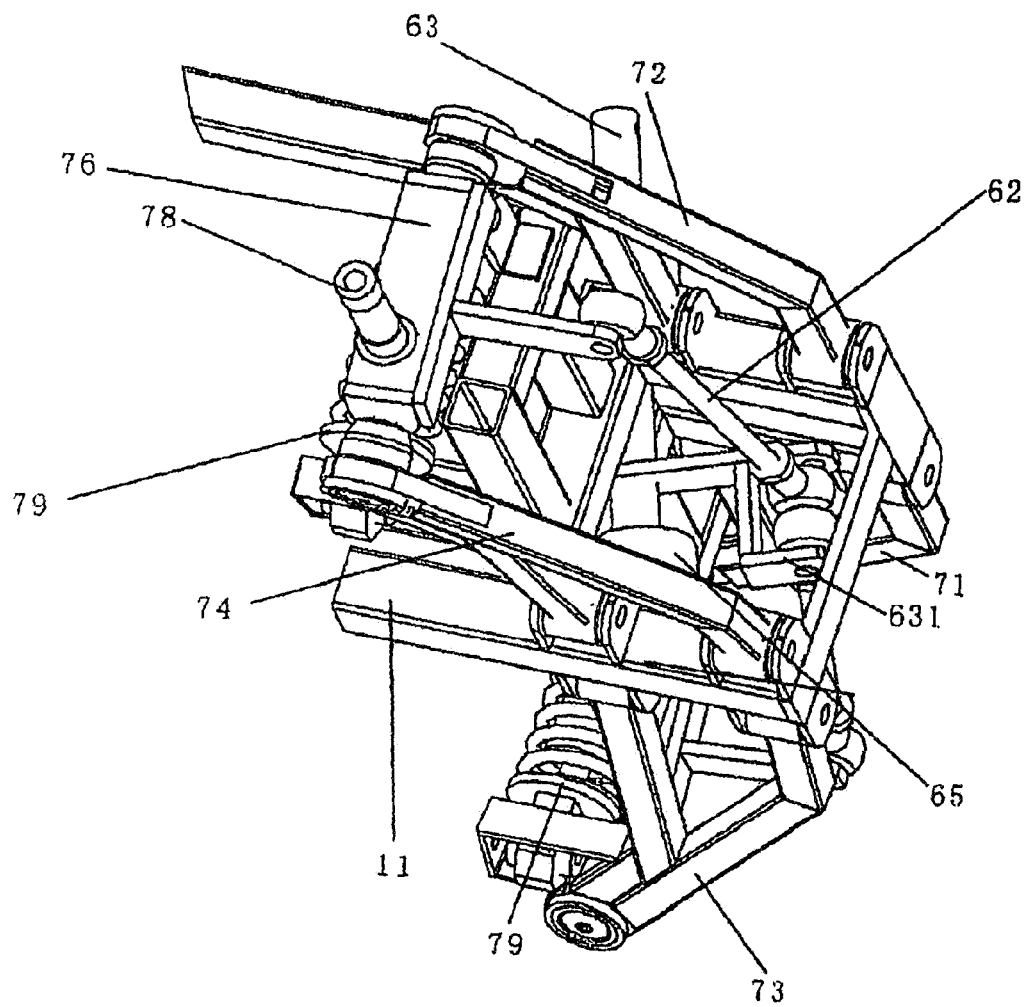
FIG. 4 is a structural schematic drawing of the embodiment of the invention shown in FIG. 3 as viewed from bottom.

As shown in FIG. 4, the steering system 6 includes left/right lateral bars 61, 62, a steering shaft 63 and a steering handle 66. Lateral bars 61, 62 are ball head link bars, with one end each thereof rotationally connected on ball head pin 75, 76 while the other ends rotationally connected on steering shaft 63. A forward protruding part 631 of the steering shaft 63 extends between installation stands 64 and 65, on which left/right lateral bars 61, 62, are co-axially connected. Thus, when the steering shaft turns, the lateral bar drives the ball head pins to turn so as to interlock the axle 77, 78 and the steering shaft 63. Since this steering system is supported by ball bearings, it turns smoothly. The turning of the front wheels is driven via lateral bars. The structure is simple and the turning is free. The trapezoid beveled edge of the suspension device makes the turning range of the front wheel tighter.

The invention claimed is:

1. An electric vehicle comprising:
   a frame;
   a seat;
   two front wheels;
   two rear wheels
   a driving device;
   a battery;
   a steering system; and
   a front wheel suspension device,
   the frame protrudes forward to form a casing for placing the battery at a middle position of a front and low end of the frame in which casing the battery is received,
   the front wheel suspension device has a front convex shape and a rear concave shape covering a front end of the casing and is pivotally joined at a middle position of the front end of the casing, and the two front wheels installed on the front wheel suspension device, and
   the steering system is connected to the front end of the frame and interlocks with the front wheels.

2. The electric vehicle as described in claim 1, wherein a rear edge of the two front wheels is located at the rear of a front edge of the battery.

3. The electric vehicle as described in claim 2, further comprising:
   two protruding upper/lower connection parts that are provided at a middle of the front end of the casing;
   two pairs of upper and lower pivot joint parts provided on the connection parts;
   a pair of front upper cantilevers;
   a pair of front lower cantilevers; and
   a vibration damper,
   front ends of the front upper and lower cantilevers are connected to pivot joint parts along a longitudinal axis of the electric vehicle,
   rear ends of the cantilevers extend towards a side rear to a side of the frame casing,
   the left and front cantilevers and right and front cantilevers are connected with left and right ball head pins at the rear of the cantilevers,
   left and right axles are provided on the left and right ball head pins and rotationally support the left and right front wheels,
   the damper is provided near the rear of the cantilevers with one end of the damper connected to the frame and another end of the damper connected to the cantilevers, and
   the steering system comprises left and right lateral bars, a steering shaft and a steering handle, the steering shaft is rotationally provided at the front of the frame and interlocks with the left and right axles via the lateral bars.

4. The electric vehicle as described in claim 3, wherein the front cantilevers at the left and the front at the right form a trapezoid.

5. The electric vehicle as described in claim 3, wherein the front ends of the upper/lower connection parts are fixed and supported by an I-shaped steel bracket.

6. The electric vehicle as described in claim 4, wherein two pairs of upper pivots and two pairs of lower pivots are provided on the connection parts and extend inside two other pairs of upper pivots and two other pairs of lower pivots,
   the front wheel suspension device has a pair of rear upper cantilevers and a pair of rear lower cantilevers which are substantially parallel to a front edge of the frame, and
   one end of the rear cantilevers is pivotally connected to the two pairs of upper pivots and two pairs of lower pivots and another end of the rear cantilevers is fixed near the rear end of the front cantilevers.

7. The electric vehicle as described in claim 6, wherein stands for the steering shaft installation are provided on the upper/lower connection parts respectively.

8. The electric vehicle as described in claim 6, wherein the casing has a downward facing concave cavity in which the battery is received.

9. The electric vehicle as described in claim 7, wherein the steering shaft comprises a forward protruding part that extends between two installation stands and provides a rotational connection for the lateral bars.

10. The electric vehicle as described in claim 9, wherein the lateral bars comprise ball head link bars.

* * * * *